Feb. 2, 1954 W. A. HEIDMAN 2,667,659
VENT WINDOW CONTROL
Filed Jan. 3, 1950 2 Sheets-Sheet 2

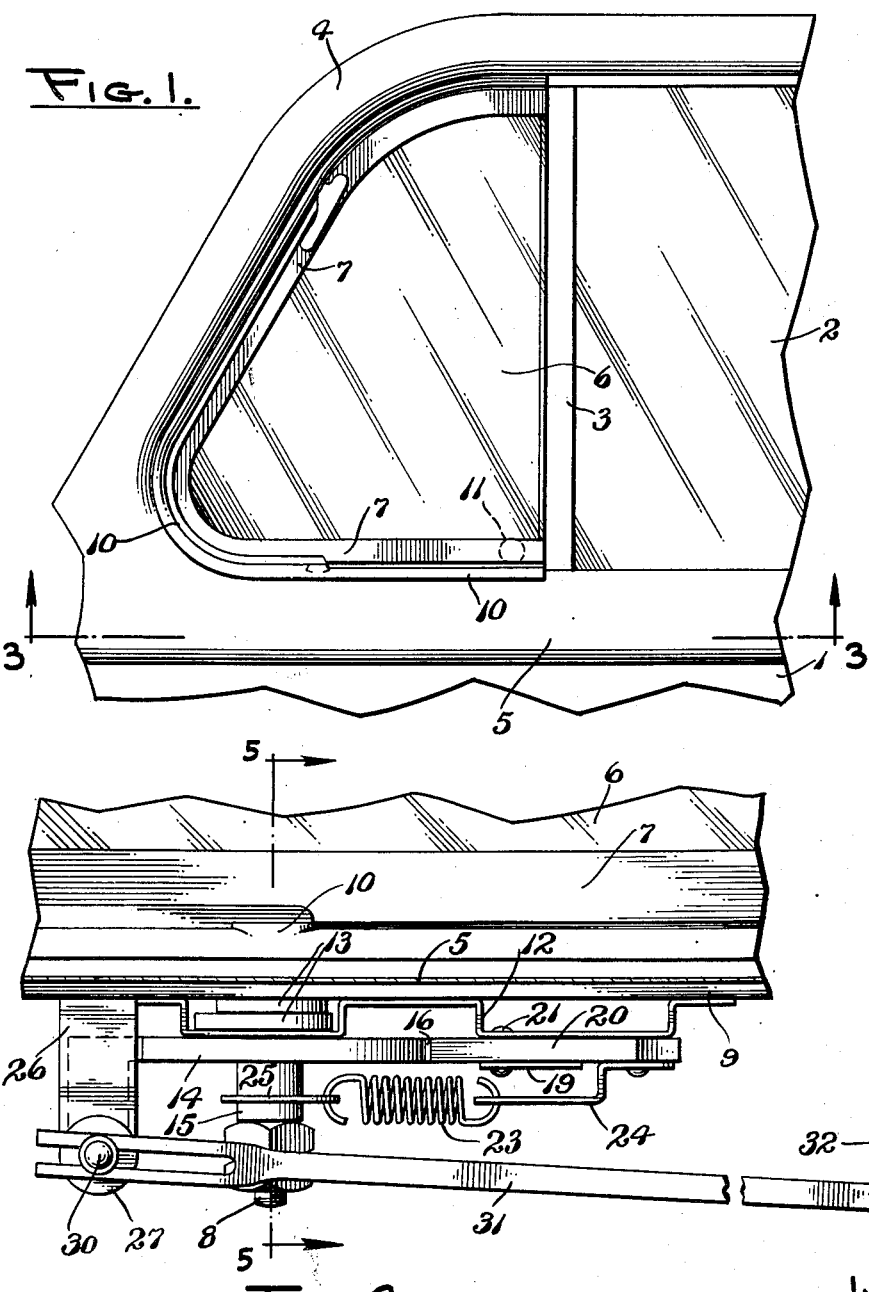

INVENTOR
WILLIAM A. HEIDMAN
BY Liverance and
Van Antwerp
ATTORNEYS

Patented Feb. 2, 1954

2,667,659

UNITED STATES PATENT OFFICE 2,667,659

VENT WINDOW CONTROL

William A. Heidman, Grand Rapids, Mich.

Application January 3, 1950, Serial No. 136,486

5 Claims. (Cl. 16—140)

The present invention relates to a novel control, holding and locking mechanism for vent windows which are commonly used at the upper, forward portions of the doors of an automobile body, one at each end of the front seat or driving compartment of the automobile; and also at the rear of the body at opposite sides of the back seat therein. Such vent windows are mounted each to turn about a vertical axis so that the front portion of the vent window is moved inwardly within the body, and the rear portion outwardly when such window is opened from its closed position. In its closed position the window engages a suitable resilient gasket to make a substantially air-tight seal around the lower, upper and forward portions of the vent window, such gasket being permanently secured to the door of the motor vehicle.

My invention is applied to the above described environment, and has for one purpose an elimination of the usual manually operable sliding bolt or other fastening or releasing means now used to hold a vent window in closed position. Further, it is an object and purpose of the invention to eliminate the vertical force of a yielding spring character to which the vent window is subjected and which as now used is for the purpose of holding the vent window against change of position from any position to which it is adjusted. Instead, I apply a braking force which is directed in a horizontal direction which serves to maintain the window in any position to which adjusted, but with which it is easy to move the window manually to any desired open position or to its closed position. A still further object is to provide, in conjunction with such braking mechanism and as a part thereof, the securing of the vent window in closed position and when in such closed position pressing and forcing it against its sealing gasket with a continuous pressure. Furthermore, with my invention, when the window is closed, it may be releasably locked in closed position and such lock released in many different ways, one of which, for example, would be by release of a lock by means of which the door on which the vent window is mounted is locked closed, as when the automobile is parked. Or the vent window may be automatically locked when moved to closed position and released by a manually operable handle at the inner side of a front door used for locking such door from the inside. Such lock may be released in various other ways without connection to any other part of the door latching or locking mechanism but by a manual operation from inside the door.

Figure 3:
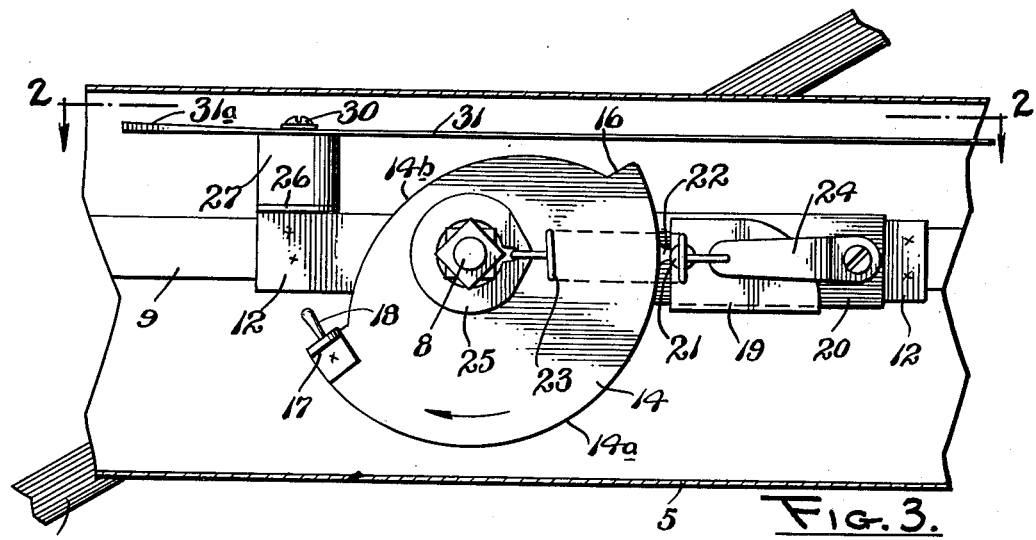
Figure 4:
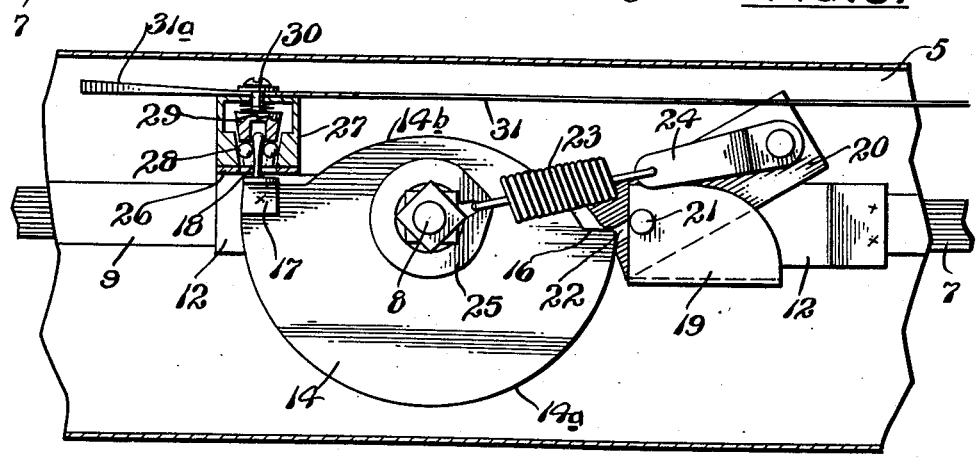
Figure 5:
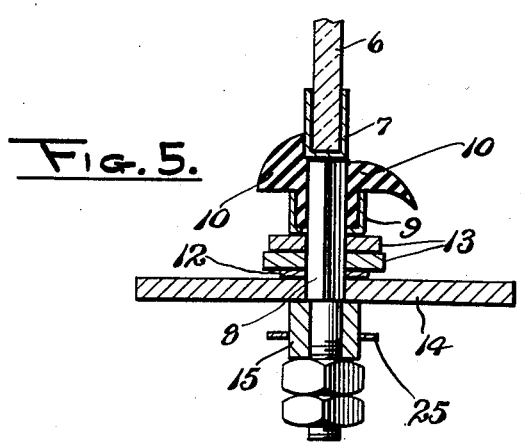

An understanding of the invention may be had from the following description, taken in connection with the accompanying drawings in which, Fig. 1 is a fragmentary elevation of the upper front portion of a front door on which my invention is mounted, Fig. 2 is a fragmentary enlarged vertical section from front to rear, at and adjacent the lower portion of the vent window carried by the door, the plane of the section being substantially that shown on line 2—2 of Fig. 3, Fig. 3 is a fragmentary enlarged horizontal section substantially on the plane of line 3—3 of Fig. 1 showing the parts in the position they occupy when the vent window is opened, Fig. 4 is a horizontal section, similar to Fig. 3, with the parts in locked position, the vent window being closed and with the lock in horizontal section, and Fig. 5 is a fragmentary transverse vertical section substantially on the plane of line 5—5 of Fig. 2.

Like reference characters refer to like parts in the different figures of the drawings.

The door, fragmentarily shown in Figure 1, at its upper portion and to the rear thereof has the usual vertically sliding window 2, the front edge of which is adjacent a vertical frame member or strip 3 which, together with the border frame at 4 and 5, at the front and at the bottom of the opening in the upper part of the door, provide a surrounding frame for the vent window 6 which, at its upper and lower edges and at its forward edge is connected with and reinforced by a channel 7. The vent window 6 of glass, with its partial surrounding frame 7, is mounted for a pivotal movement on a vertical axis. From the lower side of the lower or bottom channel 7 on the glass 6, a stem 8 extends downwardly through a channel retainer 9 fixed to the door and shaped to conform to the lower, front and upper sides of the channel border frame 7 of the vent window and which serves as a holder for a continuous gasket 10 of rubber or equivalent material. At the upper side of the vent window, a stem (not shown) extends vertically into the upper part of the automobile body, its axis being in vertical alignment with the stem 8. Thus the vent window is turnable about a vertical axis which is located forward of the rear edge of the vent window. The gasket 10 is shaped with a different cross section in front of the pivotal axis than in back of it so that when the window is closed a seal against entrance of air, moisture or the like, is made. The vent window is provided usually at its inner side and at its rear lower corner with a knob 11, pressure against which in an outward direction swings the vent window about the axis of the pivot stem 8, the rear portion of the vent window extending outwardly from the body and the front portion inwardly into the body of the automobile. This is the usual structure of vent windows commonly used and provides the environment for my invention which is applied thereto.

At the under side of the lower horizontal fixed channel 9 a flat bar 12 formed, as best shown in Fig. 2, with alternately opposed U-shaped sections, is permanently secured at its ends and middle portion by welding or other equivalent fastenings, through which bars 9 and 12 the pivot stem 8 passes, such stem also passing through some filler spacers or washers 13 between the bottom of the U-section of the bar 12 and the lower side of the channel 9. Immediately below such bar 12, a cam 14 of flat metal is located, the stem 8 passing therethrough. Such stem at its upper portion is shown as, preferably, square in cross section from its upper end to the lower side of cam 14 with circular openings through the bottom of the channel 9 and through the member 12 of sufficient diameter that the stem may turn therein; but the cam member 14 is movable with the pivot stem 8. The lower end portion of the stem 8 is circular in cross section and exteriorly threaded (Fig. 5). A short sleeve 15 is located around the lower end portion of the stem, at its upper end coming against the under side of the member 14, being forced thereagainst by nuts which are screwed on to the threaded lower end of the stem 8, thereby holding the parts in secure operative position.

The member 14, best shown in Figs. 3 and 4 is a flat plate of metal which at one side has an arcuate edge 14a approximating an arc of a circle of somewhat more than 180°. The opposite edge 14b is also shown as an arc of a circle, having a different center of curvature than the edge 14a, at opposite ends of which are shoulders, one of which at 16 is substantially a continuation of a radius drawn from the axis of the pivot pin 8. The opposite shoulder, not numbered, is parallel to the shoulder 16. At the under side of the member 14, adjacent such opposite shoulder, a bracket 17 of L-shape is welded or otherwise permanently secured, from the downwardly extending leg of which a locking pin 18 extends horizontally as shown.

On a sheet metal mounting bracket 19 of channel form secured to the member 12 and adjacent the shoulder 16 as shown in Fig. 4, a combined braking and holding member 20 is mounted for movement to turn about a vertical pivot 21 carried by the bracket 19 and the member 12. Such pivot is located a short distance from the end of the member 20 which in practice rides against the arcuate edge 14a of the member 14, or engages such member 14 at the corner provided by the shoulder 16 and the adjacent portion of the arc edge 14a, said holding member 20 being slotted at such end longitudinally for a short distance as indicated at 22. The pivot pin 21 is located in slot 22 at its inner end portion.

A relatively heavy coiled tension spring 23 at one end is connected to an arm 24 fixed to the outer end of the holding member 20 and at its other end to a flat ring 25 around the sleeve 15. The spring under tension tends to move the bar 20 into a snug braking or holding engagement with the cam member 14.

At the front end of the bar 12, an arm 26 vertically positioned, is located and extends downwardly, being fixed in relation to the bar 12, either integral therewith or permanently secured to it. A locking mechanism to cooperate with the locking pin 18 is attached to the downwardly extending arm 26 at its central outer portion, balls 28 located in such passage to grip the locking pin 18 when it is inserted between the balls through pressure exerted thereon by a spring actuated head 29, from which a headed rod 30 extends through the outer end of the housing 27. The spring around the rod 30 tends to force the balls into a tight holding or gripping connection with the pin 18.

An elongated flat bar 31, located in a generally horizontal position, has one end forked (Fig. 2) and between the tines of the fork the rod 30 passes, such fork tines riding against the free end of the lock housing 27. The tines at their free end portions 31a (Fig. 3) are progressively widened (Fig. 4) so that when bar 31 is moved longitudinally to the right in Fig. 4, the headed rod 30 is pulled outwardly and the head 29 releases its pressure against the balls 28, the grip upon the pin 18 is removed, and it may move away from the described lock from its position shown in Fig. 4 to any desired position, one of which is shown in Fig. 3. The other end of the bar 31 is shown pivotally connected to an arm or lever 32 which may be connected with any manually operable means such as a handle, the rotating barrel of a key operated lock by means of which the door may be locked against opening, or any other convenient means for manually swinging the arm 32 to move the bar 31 in the direction of its length. Other equivalent means for pulling the rod 30 outwardly will likewise accomplish the release of pin 18.

It will be apparent that the pin 18 is gripped and held by the lock described only when the vent window is closed. The vent window thereupon cannot be opened until a release of pressure of the head 29 against the balls 28 occurs. Upon such release the vent window may be swung to any of its indefinite number of open positions. When the pin 18 is released the vent window may be moved to a desired open position. Simultaneously the braking and holding member 20 moves about its pivot 21 (Fig. 3) to lie parallel with supporting member 12, and is stopped in such parallel position by coming against the vertical web of its carrying bracket 19, the strength of the spring 23 is thereupon exerted in a line parallel to the length of the member 20 so that it bears with spring pressure against the arcuate edge 14a of member 14. This maintains the member 14, which moves with the vent window, in any position to which it is turned so that the window will not aimlessly or otherwise swing or move from the position at which it is left. When the vent window is closed, at the end of the closing movement the member 20 rapidly turns from the position shown in Fig. 3 to that in Fig. 4, and gives an impulse to the member 14 to snap the vent window to closing position and into snug engagement against the sealing gasket 10.

The structure described secures the objects enumerated in a very practical and feasible manner. The usual locking bolt mounted for slidable movement, one on each vent window, is eliminated and the vent window is securely and snugly held in its closed position. It is maintained by the braking action of the member 20 against the member 14 in any position to which it is opened and it may be locked in closed position against opening all by use of a relatively simple and inexpensive structure. It is to be understood that many variations in detail of structure may be resorted to without departing from the invention or the principles upon which it operates. The specific form of lock shown is one only of innumerable locks which may be used. Other variations in detail of design may be resorted to in accordance with the teachings of the above disclosure, and my invention is to comprehend any and all of such modifications in structure which come within the scope of the claims appended hereto defining the invention.

I claim:

1. In a vent window for automobile bodies, means for mounting the vent window to turn about a vertical axis, including a vertical stem at a side of the window, a braking member having an arcuate edge secured to said stem, the arc at one end of said edge having a generally radially located shoulder, a braking bar pivotally mounted between its ends adjacent said arcuate edge of the braking member, the end of the bar nearest the braking member being longitudinally slotted for a short distance providing a fork having two spaced tines, and a coiled spring having connection at one end with the outer end of said bar and at its other end with said stem, the surfaces of said tines being adapted to bear against the arcuate edge of said braking member in one position of the bar, and the braking member at the juncture of said shoulder and its arcuate edge being adapted to enter said slot between the tines in another position of the bar.

2. In a vent window for automobile bodies having means for mounting the vent window to turn about a vertical axis, including a vertical stem at a side of the window and a frame member for the window through which the stem passes and on which it is rotatably mounted, the improvement comprising a disk having an arcuate edge secured to said stem, the center of curvature of said edge being the axis of said stem, a spring actuated brake bar against said disk, said bar being longitudinally slotted adjacent the end which bears against said arcuate edge of the disk, said bar at each side of the slot being formed to bear against said arcuate surface, spring means acting on said bar to force it against said disk in one position thereof, and means on the disk adapted to enter said slotted end thereof when brought thereto, to move said brake and change the line of force of said spring means to act upon the bar to move it to a position in which it automatically quickly turns the braking member and the vent window connected therewith to closed position, and holds the window in closed position by the force of said spring means.

3. In a vent window for automobile bodies, said vent window having means for mounting it to turn about a vertical axis, including a vertical stem at the lower side of the window and a frame member underneath the window, the improvement which comprises, a horizontally located flat braking member fixedly secured to and turnable with said stem, a braking bar slotted longitudinally at one end for a short distance, the parts of the braking bar at each side of said slots at their free ends being shaped to engage said braking member, said braking member having an arcuate surface for said ends to bear against, means for pivotally mounting said braking bar upon said frame member, the pivot of said braking bar being located at the inner end of said slot, a coiled tension spring connected at one end of the outer end of the braking bar and at the other end to said stem, said bar being adapted to be located in a position substantially parallel to said frame member, a mounting for said pivot pin carried by said frame member having means for limiting the turning movement of said braking bar in one direction so that when moved in such direction to the position in which it is substantially parallel to the frame member it is stopped against further turning movement in that direction and cooperating means on said braking member coming to the slotted end of said braking bar when the vent window is moved nearly to closed position for turning the braking bar about its pivotal axis and causing the braking bar to automatically turn the braking member and connected vent window by the force of said spring means, moving the vent window to fully closed position and yieldingly holding it therein.

4. In a vent window for automobile bodies, having a frame including a lower frame member and a means for mounting the vent window to turn about a vertical axis, including a vertical stem rotatably mounted on said frame member, the improvement comprising, a braking member having an arcuate edge surface secured to said stem, a spring actuated braking bar bearing against said braking member pivotally mounted on said frame member, said bar bearing against said arcuate edge of the braking member when the window is opened, in a line of force passing through the axis of said stem, and interengaging means on the braking member and said braking bar, operating upon moving the window to substantially closed position to move the braking bar to a position to bear against said braking member to completely close the window and locate said braking bar to engage the braking member and transmit the force of its spring actuation in a line to one side of and spaced from the axis of said window stem.

5. In a vent window for automobile bodies having a frame, including a lower frame member and a means for mounting the vent window to turn about a vertical axis, including a vertical stem passing through and rotatably mounted on said frame member, the improvement which comprises, a braking member secured to said stem having a bearing surface of a circular arc form, the center of which is coincident with the axis of said stem, a spring actuated braking bar movably mounted on said frame member, and movable between two positions, in one of which the force of said spring actuated braking member is against said arcuate surface in a direction of a line of force passing through the axis of said stem when the window is opened, and means on said braking member engageable with said braking bar when the window is moved to substantially closed position, to move said braking bar to its other position in which it engages the braking member and bears thereagainst in the direction of a line of force offset from the center of said stem, thereby automatically moving the window to completely closed position, and maintaining it by a moment force equal to the strength of the spring actuated pressure of said braking bar against said braking member multiplied by the distance that said line of force is offset from the center of said stem axis.

WILLIAM A. HEIDMAN.

References Cited in the file of this patent

UNITED STATES PATENTS

| Number | Name | Date |
|---|---|---|
| 305,260 | Wolf | Sept. 16, 1884 |
| 403,102 | Griswold | May 14, 1889 |
| 991,026 | Rodenbeck | May 2, 1911 |
| 1,996,572 | Field et al. | Apr. 2, 1935 |
| 2,069,102 | Thunder | Jan. 26, 1937 |
| 2,260,403 | Preston | Oct. 28, 1941 |

FOREIGN PATENTS

| Number | Country | Date |
|---|---|---|
| 694,791 | France | Sept. 22, 1930 |